US009025100B2

(12) United States Patent
Dorjgotov et al.

(10) Patent No.: US 9,025,100 B2
(45) Date of Patent: May 5, 2015

(54) DISPLAY WITH SHIELDING ANTIREFLECTION LAYER

(71) Applicant: Apple Inc., Cupertino, CA (US)

(72) Inventors: Enkhamgalan Dorjgotov, San Francisco, CA (US); Masato Kuwabara, Tsukuba (JP); Cheng Chen, San Jose, CA (US); Wei Chen, Palo Alto, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 13/690,304

(22) Filed: Nov. 30, 2012

(65) Prior Publication Data

US 2014/0152943 A1    Jun. 5, 2014

(51) Int. Cl.
*G02F 1/1333* (2006.01)
*H05B 33/22* (2006.01)
*G02F 1/1335* (2006.01)

(52) U.S. Cl.
CPC .......... *H05B 33/22* (2013.01); *G02F 1/133502* (2013.01); *G02F 2202/22* (2013.01)

(58) Field of Classification Search
CPC ................. H01L 2924/3025; G02F 1/133502; G02F 1/133345; G02F 1/133512; G02F 1/133606; G02F 1/1335; G02F 2001/133334; G02B 1/10; G02B 1/115; G02B 1/116; G02B 1/003; G02B 2207/121; C23C 16/402
USPC ........ 257/E21.029, 98; 349/96, 106, 137, 40, 349/138, 59; 313/111
See application file for complete search history.

(56) References Cited

U.S. PATENT DOCUMENTS

| | | | | |
|---|---|---|---|---|
| 5,105,310 | A * | 4/1992 | Dickey | 359/586 |
| 5,362,552 | A * | 11/1994 | Austin | 428/216 |
| 5,696,529 | A * | 12/1997 | Evanicky et al. | 345/659 |
| 5,874,801 | A | 2/1999 | Kobayashi et al. | |
| 6,909,486 | B2 * | 6/2005 | Wang et al. | 349/137 |
| 7,348,041 | B2 | 3/2008 | Ichimura | |
| 7,858,194 | B2 | 12/2010 | Chang et al. | |
| 8,259,261 | B2 * | 9/2012 | Kim | 349/96 |
| 2002/0181109 | A1 | 12/2002 | Chu | |
| 2013/0044282 | A1 * | 2/2013 | Kuwabara et al. | 349/96 |

FOREIGN PATENT DOCUMENTS

EP          0708063         2/1996

\* cited by examiner

*Primary Examiner* — Thoi Duong
(74) *Attorney, Agent, or Firm* — Treyz Law Group; G. Victor Treyz; Kendall P. Woodruff

(57) ABSTRACT

An electronic device may be provided with a display such as a liquid crystal display. The liquid crystal display may have a color filter layer, a thin-film-transistor layer, and a layer of liquid crystal material between the color filter layer and the thin-film-transistor layer. A lower polarizer may be formed under the thin-film-transistor layer. An upper polarizer may be formed on the color filter layer. A shielding antireflection layer may be formed on the upper polarizer. The shielding antireflection layer may serve both as a shielding layer that protects against display damage due to electrostatic charge and as an antireflection coating that helps to minimize reflections from the surface of the display. The shielding antireflection layer may include low and high index of refraction layers and a conductive layer such as a transparent conductive oxide layer that provides shielding.

20 Claims, 9 Drawing Sheets ively shielding antireflection layer

DISPLAY WITH SHIELDING ANTIREFLECTION LAYER

BACKGROUND

This relates generally to electronic devices, and more particularly, to electronic devices with displays.

Electronic devices often include displays. For example, cellular telephones and portable computers often include displays for presenting information to a user.

When touched by a user, a display may be exposed to electrostatic charge. Displays are often provided with electrostatic discharge shielding layers. An electrostatic shielding layer prevents electrostatic charge from imposing damaging electric fields on underlying display structures and thereby prevents damage to a display. Electrostatic shielding layers are formed from conductive materials to provide a low-resistance path through which electrostatic charge can be removed from display surfaces. Electrostatic shielding layers are also transparent to allow content on a display to be viewed by a user.

A commonly used material that is both transparent and conductive and that can therefore be used in forming an electrostatic discharge shielding layer is indium tin oxide. With one conventional arrangement, a layer of indium tin oxide is formed between the upper surface of a display color filter glass layer and the lower surface of an upper polarizer. Indium tin oxide electrostatic shielding layers with this type of conventional configuration may be satisfactory for providing adequate shielding and display transparency, but can give rise to undesirable light reflections from a display. In the presence of excessive reflections, content on a display may appear washed out and difficult to view by a user.

It would therefore be desirable to be able to provide improved displays having low reflectivity surfaces with electrostatic discharge shielding.

SUMMARY

An electronic device may be provided with a display such as a liquid crystal display. The liquid crystal display may have a color filter layer, a thin-film-transistor layer, and a layer of liquid crystal material between the color filter layer and the thin-film-transistor layer. A lower polarizer may be formed under the thin-film-transistor layer. An upper polarizer may be formed on the color filter layer.

A shielding antireflection layer may be formed on the upper polarizer. The shielding antireflection layer may serve both as a shielding layer that protects against display damage due to electrostatic charge and as an antireflection coating that helps to minimize reflections from the surface of the display.

The shielding antireflection layer may include low and high index of refraction layers that are formed in an alternating pattern on the surface of the color filter layer. The shielding antireflection layer may also include a conductive layer such as a layer of transparent conductive oxide that provides shielding. By forming shielding structures as part of an antireflection layer stack, shielding functions can be provided without creating undesired reflections.

The low index of refraction layers may be formed from a dielectric such as silicon dioxide. The high index of refraction layers may be formed from a dielectric such as niobium pentoxide. The transparent conductive oxide may be indium tin oxide.

The transparent conductive oxide may be located between one of the low index of refraction layers and one of the high index of refraction layers in the shielding antireflection layer.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, 3, and 4.

Figure 1:
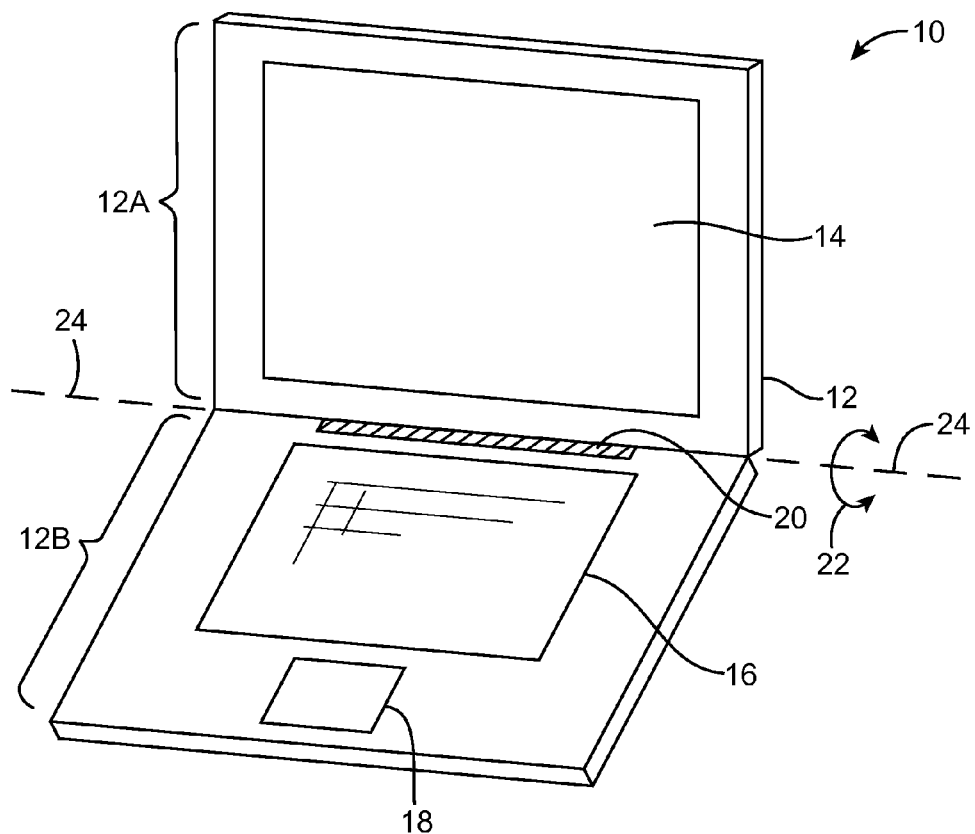
FIG. 1 is a perspective view of an illustrative electronic device such as a laptop computer with a display having a shielding antireflection layer in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
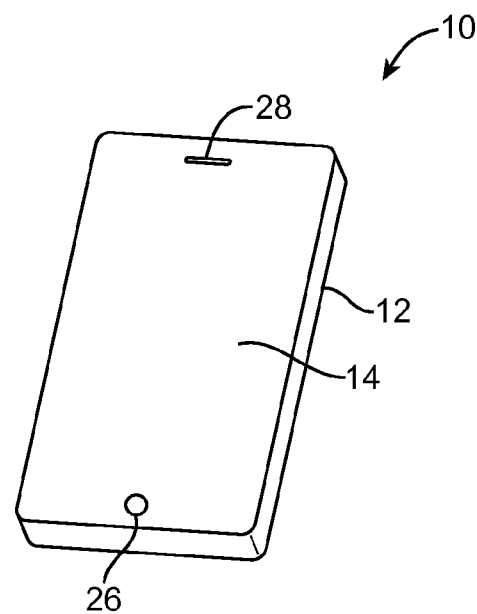
FIG. 2 is a perspective view of an illustrative electronic device such as a handheld electronic device with a display having a shielding antireflection layer in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
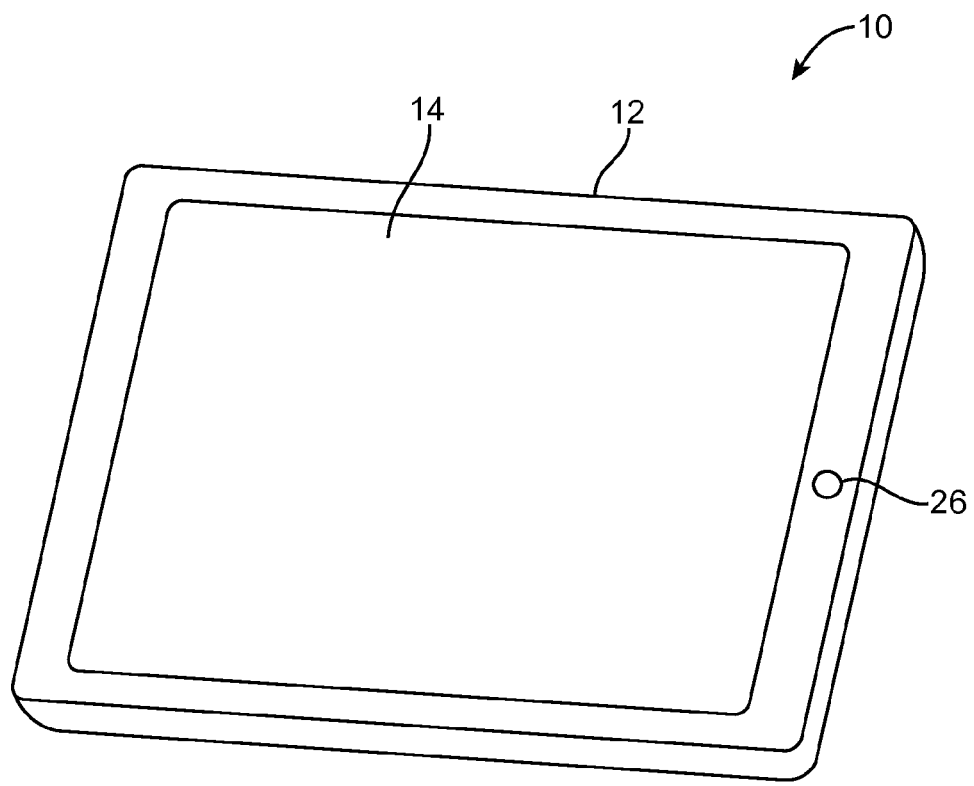
FIG. 3 is a perspective view of an illustrative electronic device such as a tablet computer with a display having a shielding antireflection layer in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
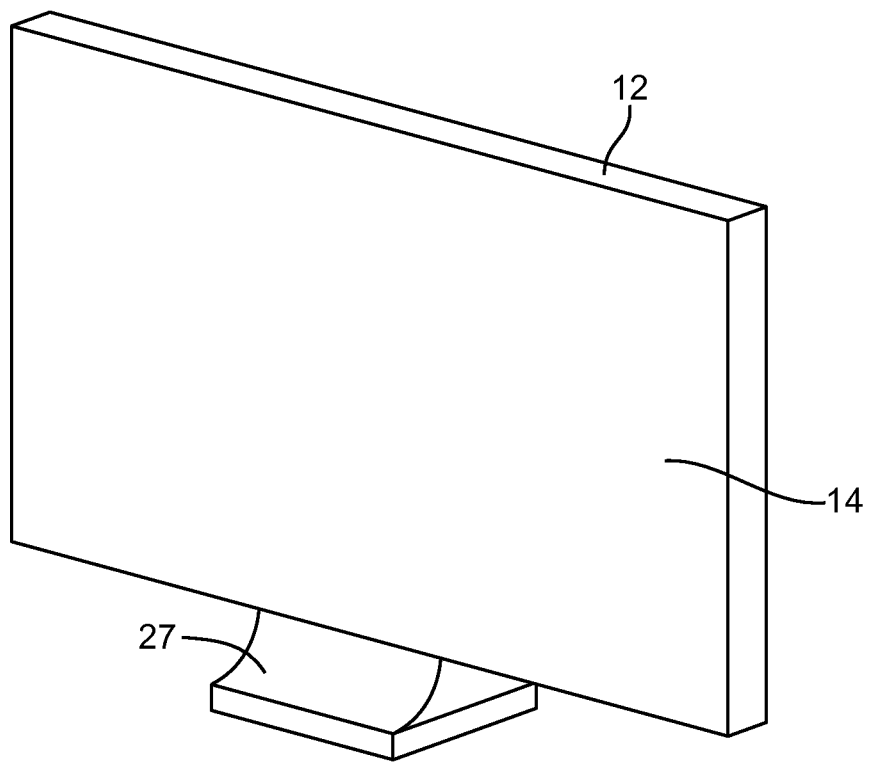
FIG. 4 is a perspective view of an illustrative electronic device such as a computer display having a shielding antireflection layer in accordance with an embodiment of the present invention.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
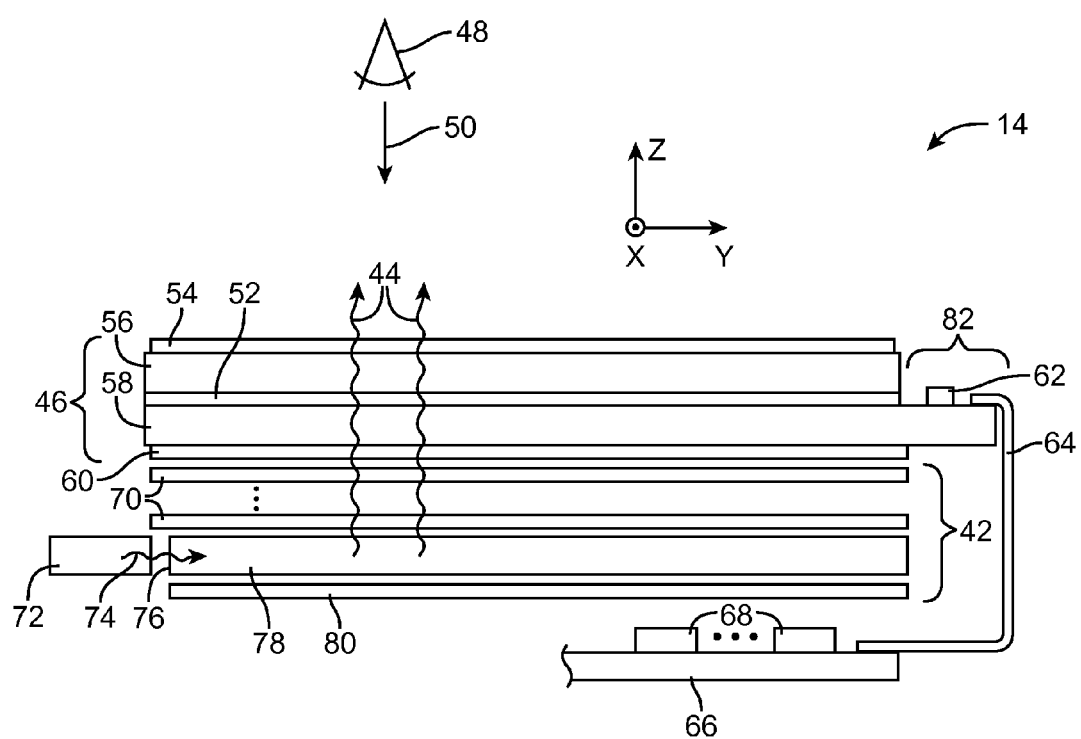
FIG. 5 is a cross-sectional side view of an illustrative display in accordance with an embodiment of the present invention.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

To provide display 14 with the ability to withstand damage from electrostatic charge when display 14 is contacted by external objects such as a user's finger or other body part, display 14 may be provided with an electrostatic discharge shielding layer such as electrostatic discharge shielding layer 112. Layer 112 may be formed as part of antireflection layer 108.

Conventional liquid crystal displays in which an electrostatic discharge shielding layer of indium tin oxide is formed on the upper surface of a color filter glass under an upper polarizer suffer from large reflections due to index of refraction mismatch between the indium tin oxide (with an index of 1.9) and adjacent layers such as the color filter glass (with an index of 1.5). In contrast, a shielding configuration of the type shown in FIG. 6 in which layer 112 is integrated into antireflection layer 108 may simultaneously exhibit both low reflectivity and satisfactory electrostatic shielding.

Figure 6:
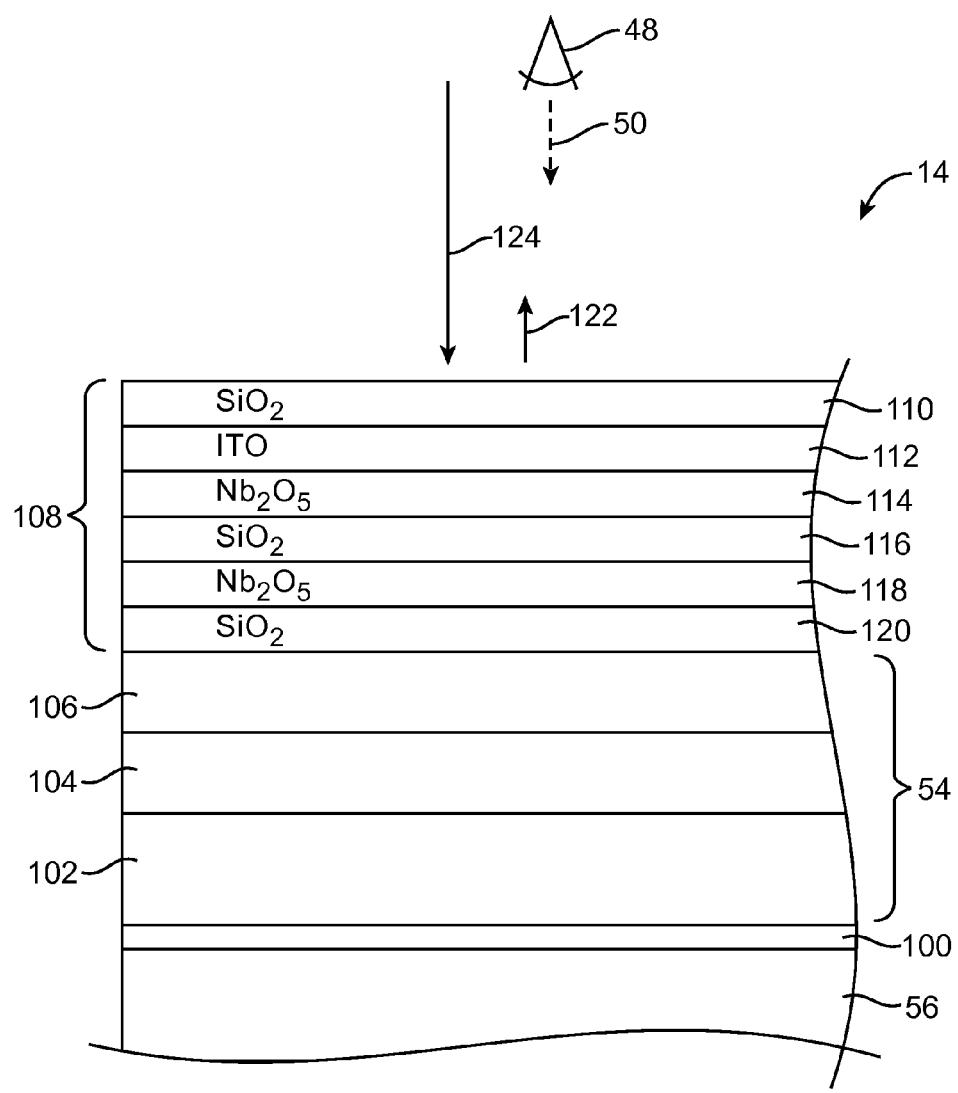
FIG. 6 is cross-sectional side view of a shielding antireflection layer on a polarizer in a display in accordance with an embodiment of the present invention.

As shown in FIG. 6, antireflection layer 108 may be formed on polarizer 54. Adhesive layer 100 may be used to attach polarizer layer 54 to the upper surface of color filter layer 56 (e.g., a glass color filter layer substrate).

Antireflection layer 108 includes a stack of multiple layers of material with different indices of refraction. The number of layers of material, the thicknesses of the layers of material, and the indices of refractions of these layers of material are preferably selected so as to minimize the amount of reflected light 122 that is generated when ambient light 124 in the visible spectrum strikes display 14. In this way, the stack of layers in layer 108 minimizes reflections and increases the visible contrast of display 14. The presence of a conductive layer of material such as layer 112 in the antireflection stack allows layer 108 to serve as a shielding electrostatic discharge protection layer to prevent damage to the components of display 14 in the presence of electric charge.

In the configuration of FIG. 6, antireflection layer 108 includes a stack of six layers—conductive layer 112 and dielectric layers 110, 114, 116, 118, and 120. Other numbers of layers may be used in forming an antireflection stack for display 14. The example of FIG. 6 is merely illustrative.

The indices of refraction in an antireflection stack alternate between high and low indices of refraction. Layers such as layers 110, 116, and 120 may, for example, be considered to be "low index" layers. Layers 112 and 114 can collectively be considered to form an upper "high index" layer. Layer 118 forms a lower "high index" layer.

In the configuration of FIG. 6, low index layers 110, 116, and 120 have been formed from silicon dioxide ($SiO_2$) and exhibit an index of refraction of 1.45. Lower high index layer 118 has been formed from niobium pentoxide ($Nb_2O_5$) and exhibits an index of refraction of 2.1. Layers 112 and 114, which collectively form the upper high index layer, have been formed from indium tin oxide (having an index of refraction of 1.9) and niobium pentoxide (having an index of refraction of 2.1). Other materials may be used for these layers if desired. For example, layer 112 may be formed from a transparent conductive layer other than indium tin oxide (e.g., another conducting oxide such as aluminum zinc oxide). Layers 110, 114, 116, and 118 may be formed oxides other than silicon dioxide and niobium pentoxide, may be formed from nitrides, etc.). The materials used in the example of FIG. 6 are merely illustrative.

The thickness of layer 110 may be greater than 1000 angstroms and the thicknesses of layers 116, 118, and 120 may be less than 2000 angstroms (as examples). The thickness of layer 112 is preferably configured so that layer 112 exhibits a satisfactorily low sheet resistance for serving as a shielding layer (e.g., 500-1000 ohms per square or other suitable value such as less than 1000 ohms per square, less than 2000 ohms per square, etc.). When the sheet resistance for layer 112 is sufficiently low, layer 112 will be sufficiently conductive to discharge electrostatic charge to ground.

To ensure that layers 112 and 114 can collectively serve as the upper high index layer in the thin-film stack of layer 108, the thicknesses of layers 112 and 114 can be chosen to exhibit a total optical thickness that is equal to the optical thickness of a single uniform high index layer such as a single niobium oxide layer of the type that might otherwise be used in forming an antireflection stack that does not include a conducting oxide layer. Consider, as an example, a five layer antireflection stack with alternating silicon dioxide and niobium oxide layers. This type of antireflection stack might use an upper niobium oxide layer with a thickness of 1000 angstroms. Because niobium oxide has an index of refraction of 2.1, the optical thickness of this layer (and therefore the target optical thickness for layers 112 and 114 in the FIG. 6 arrangement) would be 2.1*1000=2100. Layers 112 and 114 in an arrangement of the type shown in FIG. 6 can be configured to have a collective optical thickness of 2100, so that stack 108 will perform as an antireflection layer.

Although transparent, indium tin oxide tends to absorb more visible light than dielectric oxides such as silicon dioxide and niobium oxide for a given thickness. To minimize light absorption, the thickness of indium tin oxide layer 112 may therefore be maintained at a relatively small value. For example, it may be desirable to limit the thickness of indium tin oxide layer 112 to a value in the range of 200-300 angstroms or other value that provides satisfactory sheet resistance (as examples).

The thickness of niobium pentoxide layer 114 can be adjusted to ensure that the total optical thickness of layers 112 and 114 has its desired value (2100 in this example). In a scenario in which the thickness of indium tin oxide layer 112 is 250 angstroms, as an example, the optical thickness contribution of layer 112 will be 1.9*250=475 and the desired thickness T for niobium pentoxide layer 114 will be T=(2100−475)/2.1=774 angstroms. Layer 114 may be thicker in scenarios in which layer 112 is thinner and layer 114 may be thinner in scenarios in which layer 112 is thicker. If desired, different thicknesses may be used (e.g., in an antireflection stack having different oxides with correspondingly different indices of refraction and/or a different conductive material for layer 112). The position of layer 112 (and layer 114) may, if desired, be swapped with that of layer 118. In general, however, positions for conductive layer 112 that are closer to the exposed outer surface of antireflection stack 108 are preferred as more outwardly positioned conductive layers will be closer to sources of electrostatic charge and will tend to provide superior shielding.

If desired, an anti-smudge coating layer such as a layer of fluorinated material that is a few nanometers thick may be formed on the upper surface of layer 108. This type of coating is not optically significant and is therefore not shown in FIG. 6.

Antireflection layer 108 may be formed on the upper surface of upper polarizer 54. Polarizer 54 may be formed from multiple layers of material that are attached together. Polarizer film 104 may be formed from a stretched polymer such as stretched polyvinyl alcohol (PVA) and may therefore sometimes be referred to as a PVA layer. Iodine may be placed on the stretched PVA film so that iodine molecules align with the stretched film and form the polarizer. Other types of polarizer films may be used if desired.

Polarizer film 104 may be sandwiched between layers 106 and 102. Layers 106 and 102 may be formed from a material such as tri-acetyl cellulose (TAC) and may sometimes be referred to as TAC films or may be formed from other polymers. The TAC films may help hold the PVA film in its stretched configuration and may protect the PVA film. Other films may be attached to polarizer film 104 if desired.

A layer of adhesive such as adhesive layer 100 may be used to help attach polarizer 54 to the upper surface of display layers 46 (i.e., color filter 56). The thickness of polarizer 54 may be about 50-200 microns or 90-180 microns (as examples).

Figure 7:
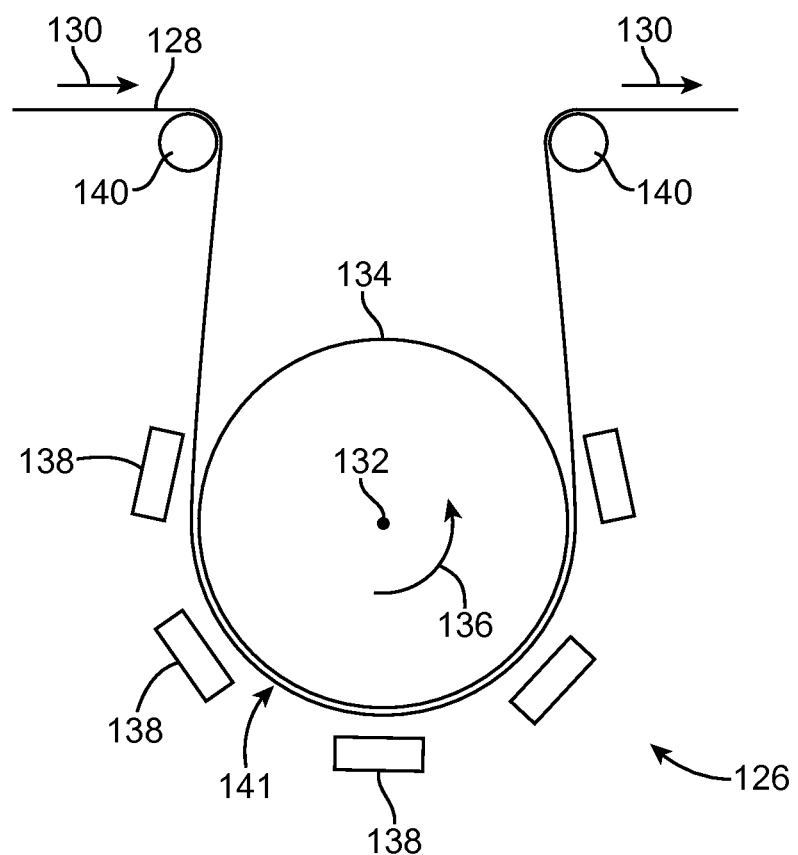
FIG. 7 is a cross-sectional side view of a system for forming multilayer display coatings such as a shielding antireflection layer in accordance with an embodiment of the present invention.

Polarizer 54 and/or an individual TAC film such as film 106 may be coated with layers 108 using physical vapor deposition equipment or other deposition tools. Illustrative physical vapor deposition equipment of the type that may be used to form the layers of material in antireflection layer 108 is shown in FIG. 7. As shown in FIG. 7, equipment 126 may include rollers such as rollers 140 and a drum such as drum 134. During operation, film 128 may move in direction 130 while being guided along rollers 140 and around drum 134. Drum 134 may rotate in direction 136 about rotational axis 132. The components of equipment 126 may be enclosed within a vacuum chamber. Physical vapor deposition equipment such as sputtering or evaporation equipment or other deposition equipment may be used to deposit materials from targets 138 onto outer surface 141 of film 128. Film 128 may be a flexible polymer film such as TAC layer 106 or polarizer layer 54. Targets 138 may be used to deposit materials such as indium tin oxide for layer 112, silicon dioxide for layers 110, 116, and 120, and niobium pentoxide for layers 114 and 118, thereby forming stack 108 on film 128. After forming thin film coatings for stack 108 using deposition equipment 126 of FIG. 7, film 128 may be combined with the other structures of display 14 to form a display 14.

Figure 8:
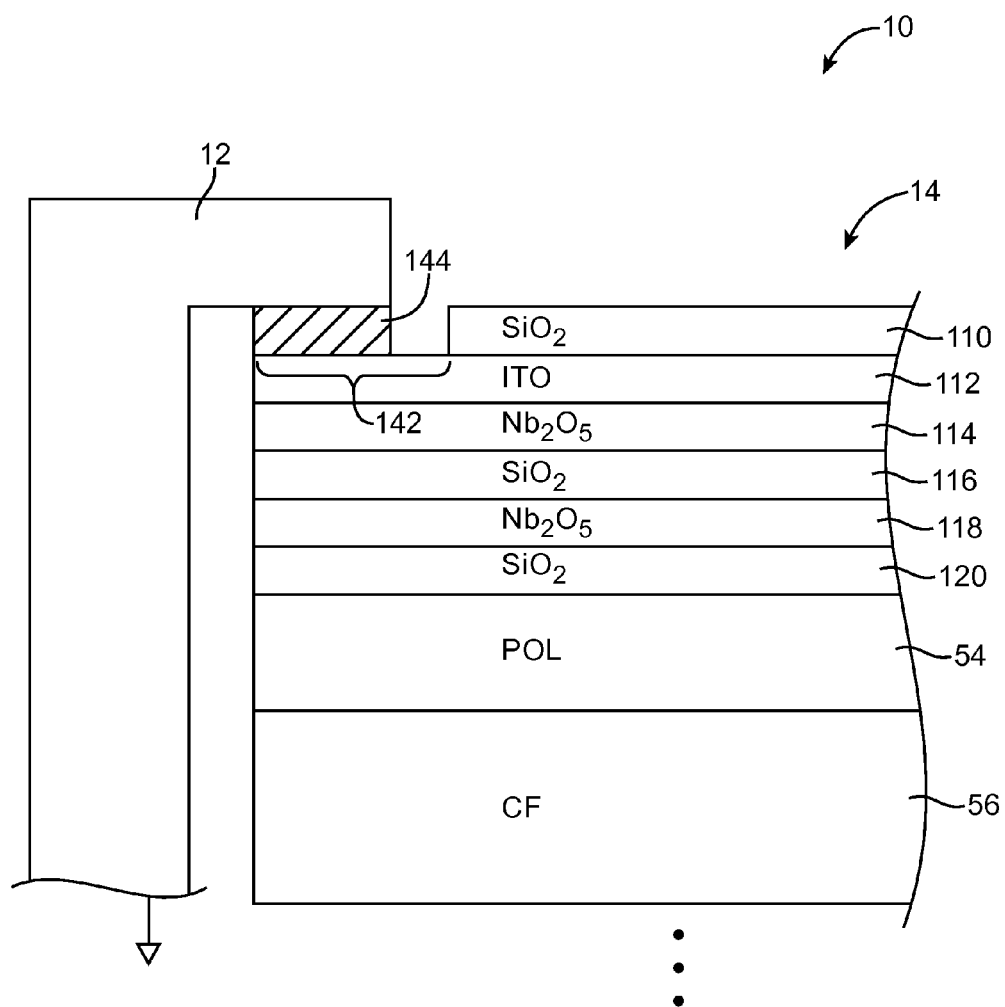
FIG. 8 is a cross-sectional side view of an illustrative display having a shielding antireflection coating in which a conductive shield layer has been shorted to ground by a conductive structure that makes contact with an exposed portion of the conductive shield layer in accordance with an embodiment of the present invention.

When installing display 14 within device 10, a grounding path may be formed between conductive shielding layer 112 and a source of ground potential such as a grounded metal housing (e.g., housing 12). A cross-sectional side view of a portion of display 14 mounted in housing 12 of device 10 is shown in FIG. 8. With the illustrative grounding configuration of FIG. 8, a portion of the surface of layer 112 such as region 142 of FIG. 8 may be exposed by etching or otherwise removing overlapping portions of silicon dioxide layer 110. This allows conductive structures 114 to electrically couple layer 112 to metal housing 12 or other grounded structures. When layer 112 is shorted to ground in this way, electrostatic charge that is placed on the surface of layer 112 may be discharged to protect the structures in display 14 from damage. Conductive structures 114 may include conductive tape such as metal tape, a silver nanowire ring, strips of metal, conductive paint (e.g., silver paint), conductive adhesive such as conductive epoxy or anisotropic conductive film, or other conductive structures. If desired, grounding may be provided using metal structures other than metal housing 12 (e.g., when forming an electrostatic charge discharge path in a device without a metal housing or when it is desired to use an internal cable or other signal path to ground layer 114).

Figure 9:
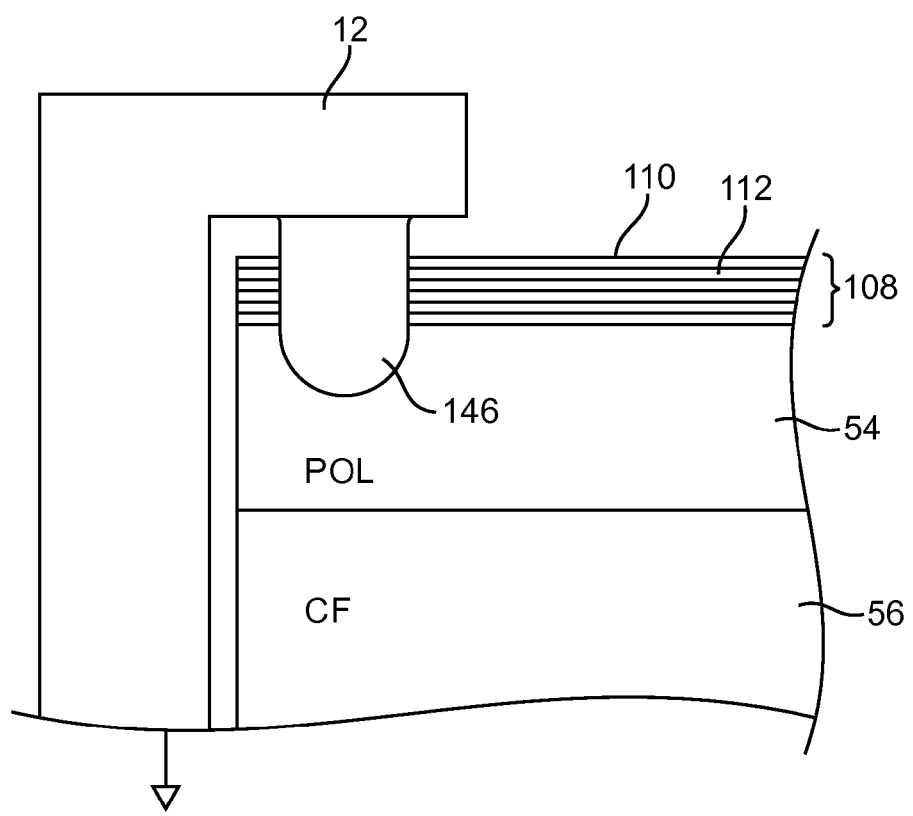
FIG. 9 is a cross-sectional side view of an illustrative display having a shielding antireflection coating in which a conductive shield layer has been shorted to ground by a conductive protrusion that makes contact with the conductive shield layer by penetrating a stack of thin-film layers in accordance with an embodiment of the present invention.

If desired, a pin or other protrusion such as metal grounding pin 146 of FIG. 9 may penetrate layer 108 and thereby form an electrical connection between layer 112 and metal housing 12 or other ground structures. It is not necessary to separately remove a portion of layer 110 with this type of configuration, because pin 146 breaks through layer 110 and shorts layer 112 to ground.

Figure 10:
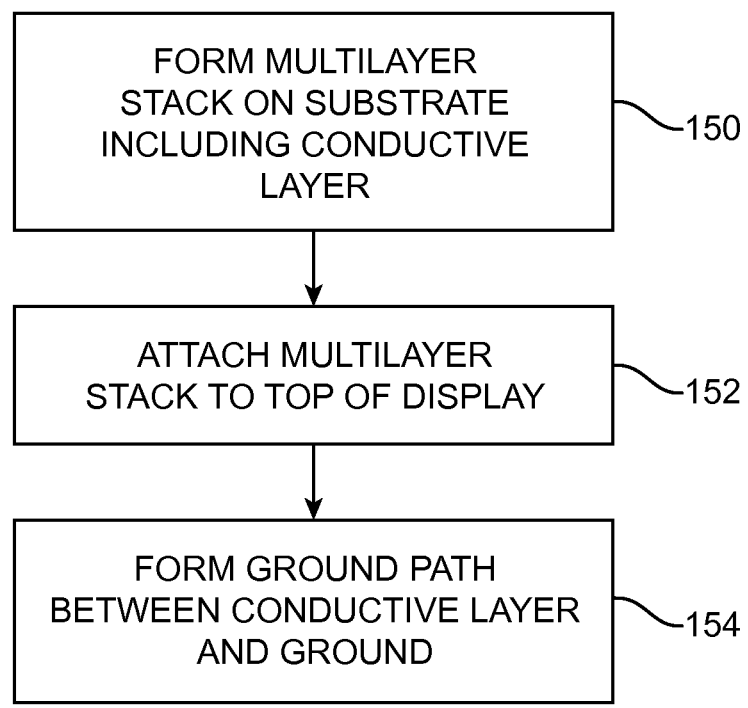
FIG. 10 is a flow chart of illustrative steps involved in forming a display with a shielding antireflection coating in accordance with an embodiment of the present invention.

Illustrative steps involved in forming device 10 and display 14 with a shielding antireflection layer such as shielding antireflection layer 108 are shown in FIG. 10.

At step 150, multilayer stack 108 may be formed on a substrate such as film 128 of FIG. 7. Multilayer stack 108 may include dielectric layers such as layers of high and low index of refraction oxides and may include a conductive layer such as a layer of indium tin oxide or other conductive oxide. The layers of stack 108 may be configured to form an antireflection coating (e.g., the thicknesses and dielectric constants of the layers of stack 108 may be configured to minimize surface reflections at visible wavelengths). The presence of the conductive layer (e.g., conductive layer 112) in layer 108 allows layer 108 to serve as an electrostatic shield in addition to serving as an antireflection layer. Film 128 may be a portion so of a polarizer layer such as TAC film layer 106 or may be a flexible sheet of polarizer material 54. In configurations in which TAC layer 106 is coated with layer 108, subsequent processing steps may be used to form polarizer 54.

Following formation of polarizer 54, polarizer 54 and shielding antireflection layer 108 on top of polarizer 54 may be laminated to the upper surface of color filter layer 56 using adhesive 100 (step 152).

At step 154, display 14 may be installed within device 10. When installing display 14 within device 10, conductive structures such as conductive structures 144 of FIG. 8 or conductive structures such as conductive pin 146 of FIG. 9 may be used to short conductive shielding layer 112 in shielding antireflection layer 108 to ground (e.g., to housing 12 or other metal structures in device 10).

The foregoing is merely illustrative of the principles of this invention and various modifications can be made by those skilled in the art without departing from the scope and spirit of the invention.

What is claimed is:

1. A display, comprising:
a display layer;
a polarizer layer on the display layer;
a shielding antireflection film on the polarizer layer, wherein the shielding antireflection film includes a plurality of dielectric layers and a transparent conductive layer, wherein a first dielectric layer of the plurality of dielectric layers is formed directly on the polarizer, and wherein a second dielectric layer of the plurality of dielectric layers having an index of refraction greater than the first dielectric layer is formed directly on the first dielectric layer of the plurality of dielectric layers, and wherein a third dielectric layer of the plurality of dielectric layers is formed directly on the second dielectric layer of the plurality of dielectric layers; and a conductive structure that shorts the transparent conductive layer to ground.

2. The display defined in claim 1 wherein the shielding antireflection film includes at least one layer of silicon dioxide.

3. The display defined in claim 2 wherein the shielding antireflection film includes at least one niobium pentoxide layer.

4. The display defined in claim 3 wherein the transparent conductive layer comprises a conductive oxide.

5. The display defined in claim 4 wherein the transparent conductive layer comprises indium tin oxide.

6. The display defined in claim 1 wherein the shielding antireflection layer includes six layers of material including five dielectric layers and an indium tin oxide layer.

7. The display defined in claim 6 wherein three of the five dielectric layers comprise silicon dioxide.

8. The display defined in claim 7 wherein two of the five dielectric layers comprise niobium pentoxide.

9. The display defined in claim 6 wherein three of the five dielectric layers comprise low index of refraction layers and where two of the five dielectric layers have indices of refraction that are greater than the low index of refraction layers.

10. The display defined in claim 9 wherein the indium tin oxide layer is interposed between one of the three low index of refraction layers and one of the two dielectric layers having indices of refraction greater than the low index of refraction layers.

11. The display defined in claim 10 wherein the conductive structure shorts the indium tin oxide layer to ground.

12. The display defined in claim 11 wherein the conductive structure comprises at least one metal pin that penetrates the shielding antireflection layer.

13. A display, comprising:
a color filter layer;
a thin-film-transistor layer;
a layer of liquid crystal material between the color filter layer and the thin-film transistor layer;
a polarizer on the color filter layer; and
a shielding antireflection layer on the polarizer, wherein the shielding antireflection layer includes a conductive oxide layer configured to serve as an electrostatic shielding layer and includes a plurality of dielectric layers, wherein a first dielectric layer of the plurality of dielectric layers having an index of refraction lower than the conductive oxide layer is formed directly on the polarizer, and wherein a second dielectric layer of the plurality of dielectric layers having an index of refraction greater than the conductive oxide layer is formed directly on the first dielectric layer of the plurality of dielectric layers, and wherein a third dielectric layer of the plurality of dielectric layers is formed directly on the second dielectric layer of the plurality of dielectric layers.

14. The display defined in claim 13 wherein the dielectric layers are interposed between the conductive oxide layer and the polarizer.

15. The display defined in claim 13 further comprising a layer of dielectric on the conductive oxide layer.

16. The display defined in claim 15 wherein the layer of dielectric on the conductive oxide layer comprises a layer of silicon dioxide.

17. The display defined in claim 16 wherein the dielectric layers that are interposed between the conductive oxide layer and the polarizer include a plurality of low index of refraction layers and a plurality of high index of refraction layers each having an index of refraction greater than the low index of refraction layers.

18. The display defined in claim 17 wherein the conductive oxide layer is formed on one of the high index of refraction layers.

19. An electronic device, comprising:
a liquid crystal display having an upper polarizer with an upper surface;
a plurality of layers of material on the upper surface configured to form an antireflection coating for the liquid crystal display, wherein the plurality of layers of material include a plurality of dielectric layers including a plurality of low index of refraction layers and a plurality of high index of refraction layers each having an index of refraction greater than the low index of refraction layers and wherein the plurality of layers includes a conductive transparent layer on the plurality of dielectric layers; and
an additional low index of refraction layer formed directly on top of the conductive transparent layer, wherein one low index of refraction layer of the plurality of low index of refraction layers is formed directly on the upper surface of the upper polarizer, and wherein the additional low index of refraction layer and the low index of refraction layer formed directly on the upper surface of the upper polarizer have the same index of refraction.

20. The electronic device of claim 19, wherein the plurality of low index of refraction layers and the plurality of high index of refraction layers on the upper surface are arranged in an alternating pattern.

* * * * *